United States Patent
Lim et al.

(10) Patent No.: US 7,860,332 B2
(45) Date of Patent: Dec. 28, 2010

(54) METHOD AND SYSTEM FOR DETERMINING AN INDICATION OF FOCUS OF AN IMAGE

(75) Inventors: Suk Hwan Lim, Mountain View, CA (US); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1410 days.

(21) Appl. No.: 11/031,877

(22) Filed: Jan. 7, 2005

(65) Prior Publication Data

US 2006/0153471 A1 Jul. 13, 2006

(51) Int. Cl.
*G06K 9/36* (2006.01)
(52) U.S. Cl. .................................... 382/255
(58) Field of Classification Search ........... 382/206, 382/254, 255, 319; 348/349, 354, 356
See application file for complete search history.

(56) References Cited

U.S. PATENT DOCUMENTS

| | | | |
|---|---|---|---|
| 6,341,179 B1* | 1/2002 | Stoyle et al. | 382/254 |
| 2003/0068100 A1* | 4/2003 | Covell et al. | 382/305 |
| 2003/0117511 A1* | 6/2003 | Belz et al. | 348/333.11 |
| 2003/0174230 A1* | 9/2003 | Ide et al. | 348/345 |
| 2003/0202693 A1* | 10/2003 | Nakajima et al. | 382/170 |
| 2004/0234153 A1* | 11/2004 | Nakami | 382/254 |
| 2006/0078217 A1* | 4/2006 | Poon et al. | 382/255 |

FOREIGN PATENT DOCUMENTS

WO WO 2004/030378 * 4/2004

OTHER PUBLICATIONS

Loui, Alexander et al. "Automated Event Clustering and Quality Screening of Consumer Pictures for Digital Albuming", IEEE Transactions on Multimedia vol. 5, No. 3, Sep. 2003, pp. 390-402.*
Loui, Alexander et al. "Automatic Image Event Segmentation and Quality Screening for Albuming Applications", IEEE International Conference on Multimedia and Expo, Jul. 2000, pp. 1-4.*
Lim et. al, "Automatic Focus Quality Analysis for Managing Large Collection", Proceedings of SPIE Multimedia Systems and Applications VIII, vol. 6015, Oct. 23, 2005, pp. 1-8.*

* cited by examiner

*Primary Examiner*—Andrew W Johns

(57) ABSTRACT

A method for determining an indication of how well-focused an image is. An image is divided into a plurality of blocks. At least one local measure is determined for at least one block of the plurality of blocks. At least one global figure-of-merit is determined for the image based on the local measure. An indication of focus is determined based on the global figure-of-merit.

27 Claims, 6 Drawing Sheets

350

METHOD AND SYSTEM FOR DETERMINING AN INDICATION OF FOCUS OF AN IMAGE

TECHNICAL FIELD

Embodiments of the present invention relate to the field of image processing. More specifically, embodiments of the present invention relate to a method and system for determining an indication of how well an image is focused.

BACKGROUND ART

The auto-focus functionality of a digital camera is not always robust. Photographs taken with auto-focus setting can still result in out-of-focus images. For some photos, the entire image is out-of-focus, which may result from the global motion of the camera during capture or from failures of auto-focus function (e.g., when the digital camera failed to find appropriate focus for any part of the image). In some other situations, only part of the image is focused. For example, the digital camera focuses on the background instead of the foreground if the image is not properly focused. In this case, detecting out-of-focus photos is not a trivial task since it involves determining the foreground and the background.

With the advent of digital cameras, taking photographs has become a fun and easier experience. The number of photographs taken each year is growing exponentially, in part due to the low cost and ease of use of digital cameras. Higher numbers of captured photographs require more effort in selecting the photographs for archiving and printing. For example, sorting through tens or even hundreds of photographs taken during a trip to select the photographs to print or save can be a very laborious task. In the selection process, one of the first criteria that the consumer often uses to decide to print a digital photograph is whether it is focused or not.

When the selection process is taken place on a personal computer, the consumer would display the photographs on a CRT monitor or LCD screen and he/she would have to look at the photograph very carefully and often zoom in to see if the image is indeed focused. It becomes an even more difficult process when the consumer would have to determine the sharpness by looking at the display devices where the spatial resolution is limited. For example, it is very difficult to judge whether the photograph is focused or not by viewing it on the small LCD screen that is typically attached to a digital camera or a printer.

There has been research directed toward a similar problem of detecting the sharpness of images. However, these methods have drawbacks that make them ill suited for use in solving the problems described above. In one method, the overall sharpness of an image is measured to determine how much sharpening should be applied to each image. The global sharpness of an image is estimated, which is provided as a single value per image. However, sharpness of an image may not be uniform throughout the image especially when the depth of focus is small such that some parts of the image are blurry while some other parts are sharp. For example, consider an image where the background is sharp and the foreground is blurred. While the image may be classified as sharp by a classifier that examines the overall sharpness of an image, the image would not be well-focused. In general, the sharpness of the foreground determines how well-focused the image is. Thus, this method cannot determine whether the image is properly focused or mistakenly focused on the background. A second method has been developed to segment the main subject and realize the one-third composition rule. To segment the foreground, an additional photo with larger aperture is captured and the difference of the frequency content between the two images taken with different apertures is analyzed. A drawback of this method is that it requires an additional image and that it tries to enforce the one-third composition rule, which may not be applicable in many photographic images. What would be desirable is a technique for providing an indication of how well an image is focused.

DISCLOSURE OF THE INVENTION

Embodiments of the present invention pertain to a method for determining an indication of how well-focused an image is. An image is divided into a plurality of blocks. At least one local measure is determined for at least one block of the plurality of blocks. At least one global figure-of-merit is determined for the image based on the local measure. An indication of focus is determined based on the global figure-of-merit.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Figure 1:
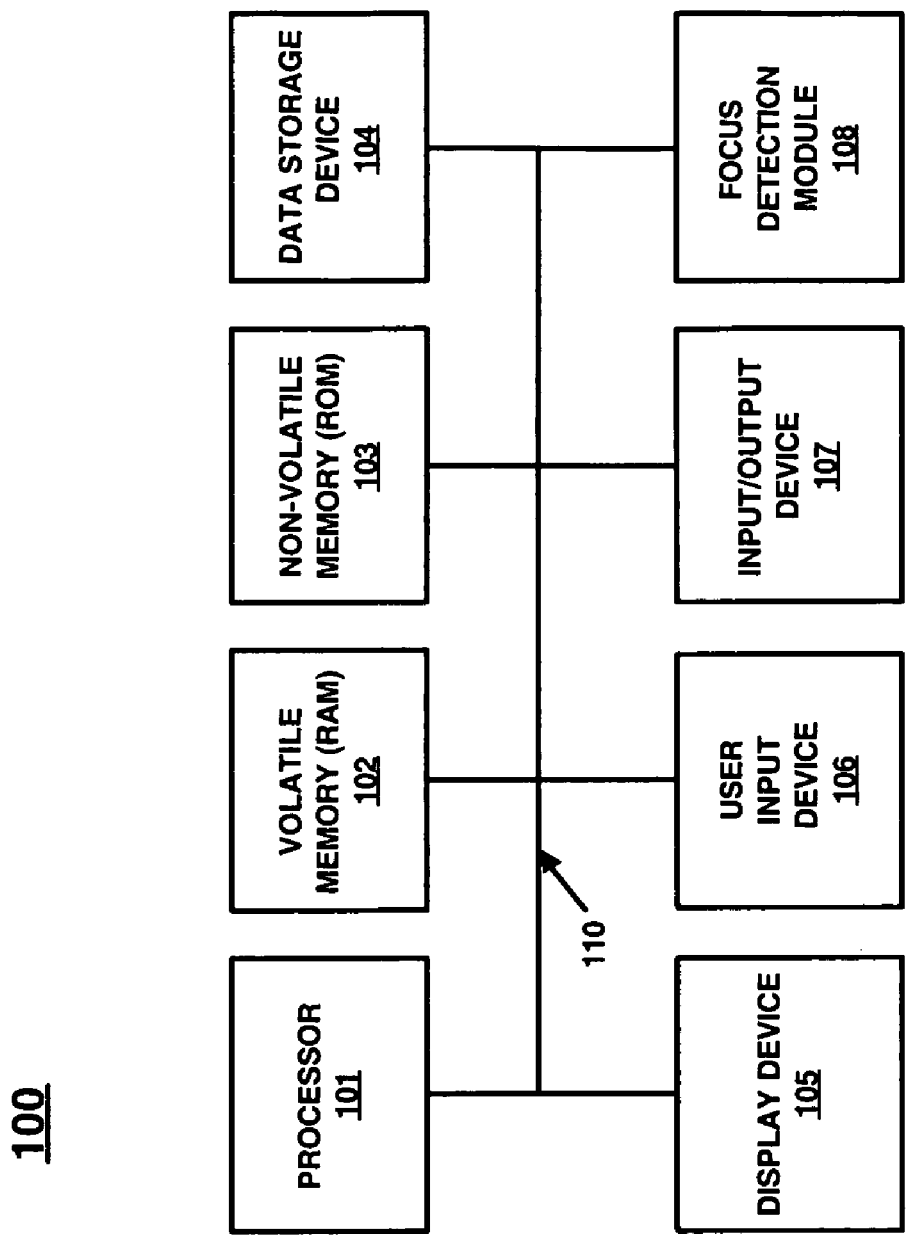
FIG. 1 is a block diagram of an electronic device, in accordance with one embodiment of the present invention.

Refer now to FIG. 1 that illustrates an exemplary electronic device 100 upon which embodiments of the present invention may be practiced. In general, electronic device 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, and data storage device 104 such as a magnetic or optical disk and disk drive coupled with bus 110 for storing information and instructions.

Electronic device 100 also comprises focus detection module 108 for determining an indication of how well-focused an image is of an image. The indication of how well-focused an image is may be used to advise a user as to the sharpness of the foreground of an image. It should be appreciated that focus detection module 108 may be implemented as software, hardware, firmware, or any combination thereof. In one embodiment, focus detection module 108 is implemented as computer instructions stored in non-volatile memory 103 for instructing processor to determine an indication of focus for an image. Images may be stored in volatile memory 102, non-volatile memory 103, or data storage device 104.

In one embodiment, electronic device 100 comprises an optional user output device such as display device 105 coupled to bus 110 for displaying information to the computer user, an optional user input device 106 (e.g., a keyboard or a mouse) coupled to bus 110 for communicating information and command selections to processor 101, and an optional input/output (I/O) device 107 is used to couple electronic device 100 onto, for example, a network.

In one embodiment, electronic device 100 is a digital camera. In the present embodiment, display device 105 is a liquid crystal display (LCD) device suitable for creating graphic images and alphanumeric characters recognizable to the user. User input device 106 may include buttons of the digital camera that allow a user to navigate through images and functions. In one embodiment, data storage device 104 is a removable flash memory device.

In another embodiment, electronic device 100 is a photo printer. In the present embodiment, display device 105 is an LCD device. User input device 106 may include buttons of the photo printer that allow a user to navigate through images and functions. In one embodiment, data storage device 104 is a removable flash memory device.

In another embodiment, electronic device 100 is a computer system. In the present embodiment, display device 105 utilized with electronic device 100 may be an LCD device, a cathode ray tube, or other display device suitable for creating graphic images and alphanumeric characters recognizable to the user. User input device may include a keyboard and a curser control device, such as a mouse. In one embodiment, data storage device 104 is a removable flash memory device.

Figure 2:
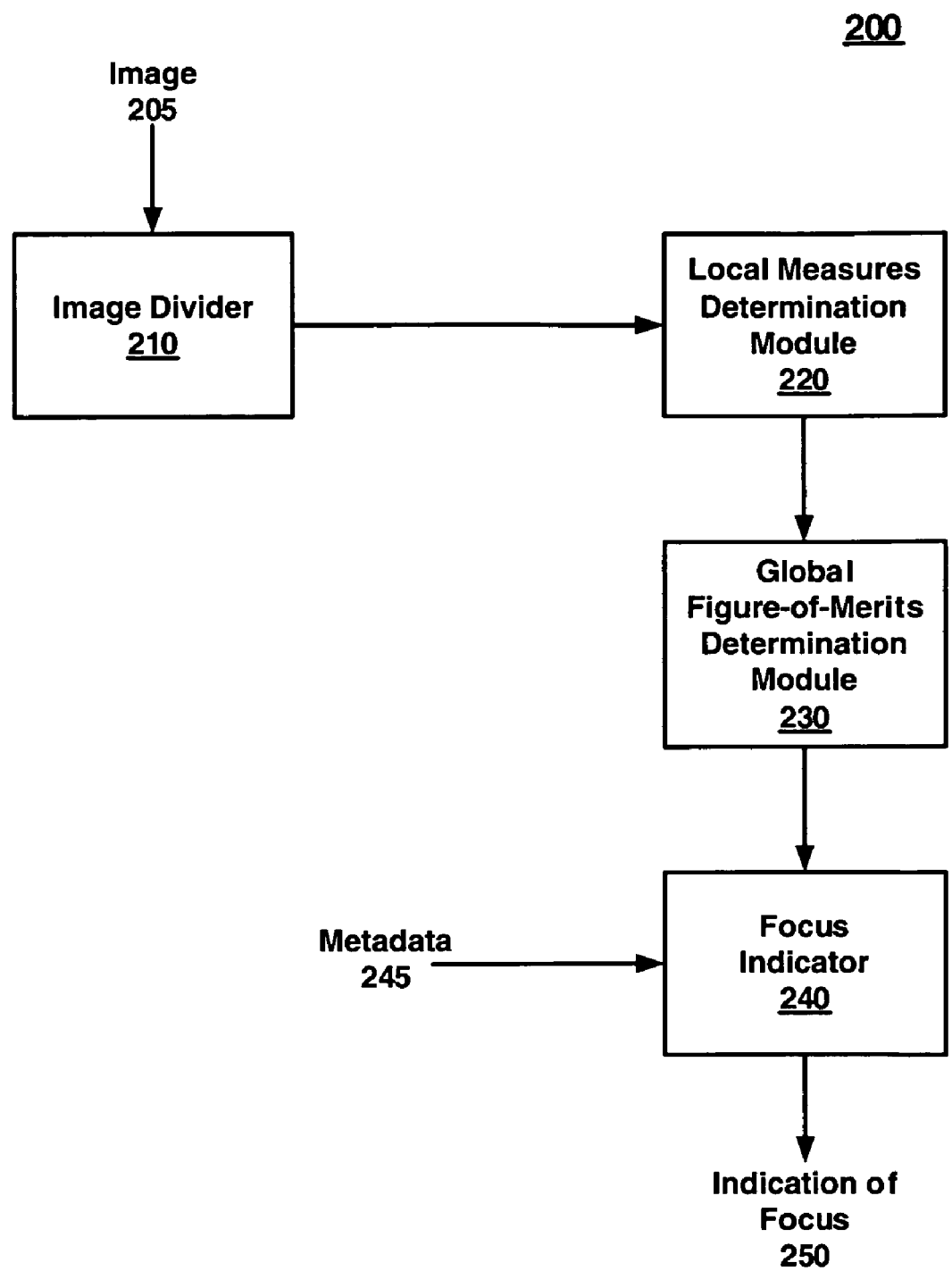
FIG. 2 is a block diagram of a system for determining an indication of how well-focused an image is, in accordance with one embodiment of the present invention.

FIG. 2 is a block diagram of a system 200 for determining an indication of focus 250 for an image 205, in accordance with one embodiment of the present invention. It should be appreciated that system 200 may be implemented within an electronic device (e.g., focus detection module 108 of electronic device 100 of FIG. 1), such as a digital camera, a photo printer, or a computer system. The indication of focus 250 may be used to advise a user as to the how ill-focused an image is (e.g., image 205).

System 200 includes image divider 210, local measures determination module 220 global figure-of-merits determination module 230, and focus indicator 240. It should be appreciated that the components of system 200 may be implemented within software, hardware, firmware, or any combination thereof. Furthermore, it should be appreciated that the components of system 200 may be included within a single electronic device, or may be distributed over a computer network.

Image divider 210 receives image 205. As described above, image 205 may be stored in memory of an electronic device that is accessible to system 200. Image divider 210 is operable to divide the image into a plurality of blocks of image data or pixel data. In one embodiment, the blocks are non-overlapping blocks. The number of blocks image divider 210 divides image 205 into is a design parameter and represents computing tradeoffs of accuracy versus computational efficiency. In general, the number of blocks is proportional to the image size. For example, for an image having a size in the range of 3 to 5 megapixels, the image may be divided into blocks of 100 pixels by 100 pixels. In general, the smaller the image, the smaller the block size and the bigger the image, the bigger the block size.

In one embodiment, the optimal block size is determined by optimally selecting parameters, such as the decimation factor and the threshold value for edge detection, used in determining the local sharpness measure. In one embodiment, the parameters are chosen that maximize the dynamic range of the sharpness values. The smallest threshold and block size that provides a good dynamic range while still being consistent is chosen.

Local measures determination module 220 is operable to compute various local measures for the blocks of image 205. There are a number of local measures that can be calculated by local measures determination module 220, including but not limited to: a sharpness measure, an average brightness, an average color saturation, a sky determination, a snow determination, and a saturation determination. It should be appreciated that any number of local measures may be used, and that embodiments of the present invention are not limited to the described local measures.

In one embodiment, the red-green-blue (RGB) values of the pixels of the blocks are converted to hue-saturation-intensity (HSI) values for computing the local measures. In one embodiment, the hue is determined according to Equation 1:

$$Hue(x, y) = \cos^{-1}\left\{ \frac{\frac{1}{2}[(R(x, y) - G(x, y)) + (R(x, y) - B(x, y))]}{[(R(x, y) - G(x, y))^2 + (G(x, y) - B(x, y))(R(x, y) - B(x, y))]} \right\} \quad (1)$$

where R(x,y) is the red value, G(x,y) is the green value, and B(x,y) is the blue value for pixel (x,y) in the block.

In one embodiment, the average color saturation measure is determine according to Equation 2:

$$avgColSat = \frac{\sum_{(x,y) \in B_{ij}} 1 - 3 \cdot \frac{\min(R(x, y), G(x, y), B(x, y))}{R(x, y) + G(x, y) + B(x, y)}}{N} \quad (2)$$

where R(x,y) is the red value, G(x,y) is the green value, and B(x,y) is the blue value for pixel (x,y) in the block, and N is the number of pixels in the block.

In one embodiment, the average brightness measure is determine according to Equation 3:

$$angBrightness = \frac{\sum_{(x,y) \in B_{ij}} 0.3^*R(x, y) + 0.5^*G(x, y) + 0.2^*B(x, y)}{255^*N} \quad (3)$$

where R(x,y) is the red value, G(x,y) is the green value, and B(x,y) is the blue value for pixel (x,y) in the block, and N is the number of pixels in the block.

In one embodiment, the sharpness measures of the blocks are computed using the intensity values (e.g. brightness values). In determining a sharpness measure, the key assumption in estimating the sharpness is that natural images are fractals and that the magnitude of the Fourier transform is inversely proportional to f, as shown in Equation 4:

$$|A(f)| \approx \frac{\alpha}{f} \quad (4)$$

where a(x) is the one-dimensional cross section of the image, a is a constant, f is the spatial frequency, and A(f) is the Fourier transform. Deviation from this is assumed to be caused by image blur due to motion blur or focus error from the camera. Using this assumption and Parseval's theorem, Equation 5 is derived:

$$\int_{f2}^{f1} |A(f)|^2 f^2 df = \quad (5)$$

$$\int_{-\infty}^{\infty} |A(f)W(f)f|^2 df = \int_{-\infty}^{\infty} |a'(x)^*w(x)|^2 dx = \alpha^2 (f1 - f2)$$

where w(x) is the ideal band pass filter that only passes frequency between f2 and f1. For a(x), the one-dimensional cross section of natural images, the signal energy after band pass filtering the derivative (or gradient) of a(x) is proportional to the bandwidth of the filter. Thus, computing the ratio between the high-pass and the low-pass energy of the gradient (a'(x)) should only depend on the bandwidth of the filters for ideal images that meet the fractal assumption. For ill-focused images, however, the magnitude of the Fourier transform would drop faster than that of the natural images (fractals), so the ratio of high-pass energy to low-pass energy would be lower than that in a well-focused image.

In one embodiment, the computation is performed in spatial domain, applying one-dimensional Infinite Impulse Response (IIR) filters along the horizontal pixel lines and vertical columns. Note that the sharpness measure, which is the ratio between the high-pass and the low-pass energy of the gradient, can be obtained for each line or column. Assuming that the sharpness is uniform within the block, the sharpness value for the block is obtained by averaging the sharpness values of all the lines and columns in the block. Also, since sharpness can only be estimated when there is enough texture (e.g., edges and corners), the ratio is computed only when there is an edge whose gradient is higher than a certain threshold. Note that performing the computation on a subsampled set of lines and columns can reduce the computational complexity. Since the process only requires filtering and computing the energy, it is very efficient. Note also that IIR filters can be replaced with Finite Impulse Response (FIR) filters if fixed point operations are desired.

Also, since sharp reflection and flare can cause problems for the local sharpness estimation, embodiments of the present invention are operable to detect sharp reflection and flare. Thus, if it is determined that the block has any strong reflectance, the sharpness value for the block may be ignored. To increase the robustness of system 200, confidence measures are obtained by computing the variance of sharpness values of the lines and columns in the block. In one embodiment, sharpness measures that have large variance of the sharpness values within the block are ignored.

In one embodiment, the average intensity value is computed for each block to obtain overall brightness of the block. The average intensity value is aimed at assessing whether the foreground is brighter than the background. In one embodiment, the average saturation is computed to assess whether the colors of the foreground are more vivid than the colors of the background.

In one embodiment, a determination is made as to whether the block is sky. The average hue values are used to detect clear blue sky. In one embodiment, when more than 70% of the pixels in the block have hue values greater than 3.1 and less than 3.8, the block is considered to be part of clear blue sky. Clear blue sky is detected because it is one of occasions where the background is brighter than the foreground and the colors of the background are more vivid than the colors of the foreground.

In one embodiment, a determination is made as to whether the block is a white background, such as snow. The average color saturation measures and average brightness measures are used to detect a white background. In one embodiment, where the average color saturation measure is less than 0.15, and the average brightness measure is greater than 0.8, the block is considered to be white background. As with blue sky, a white background such as snow is detected is because it is one of occasions where the background is brighter than the foreground.

In one embodiment, a determination is made as to whether the block is saturated. The luminance value, which may be determined from the RGB values, is used to detect saturation. In one embodiment, when more than 5% of the pixels in the block have a luminance value of greater than 250, the block is considered saturated.

Global figure-of-merits determination module 230 is operable to compute various global figure-of-merits for image 205 based on the local measures. There are a number of global figure-of-merits that can be calculated by global figure-of-merits determination module 230, including but not limited to: composition, brightness index, color saturation index, density of sharp blocks, and median of sharpness values.

Figure 3A:
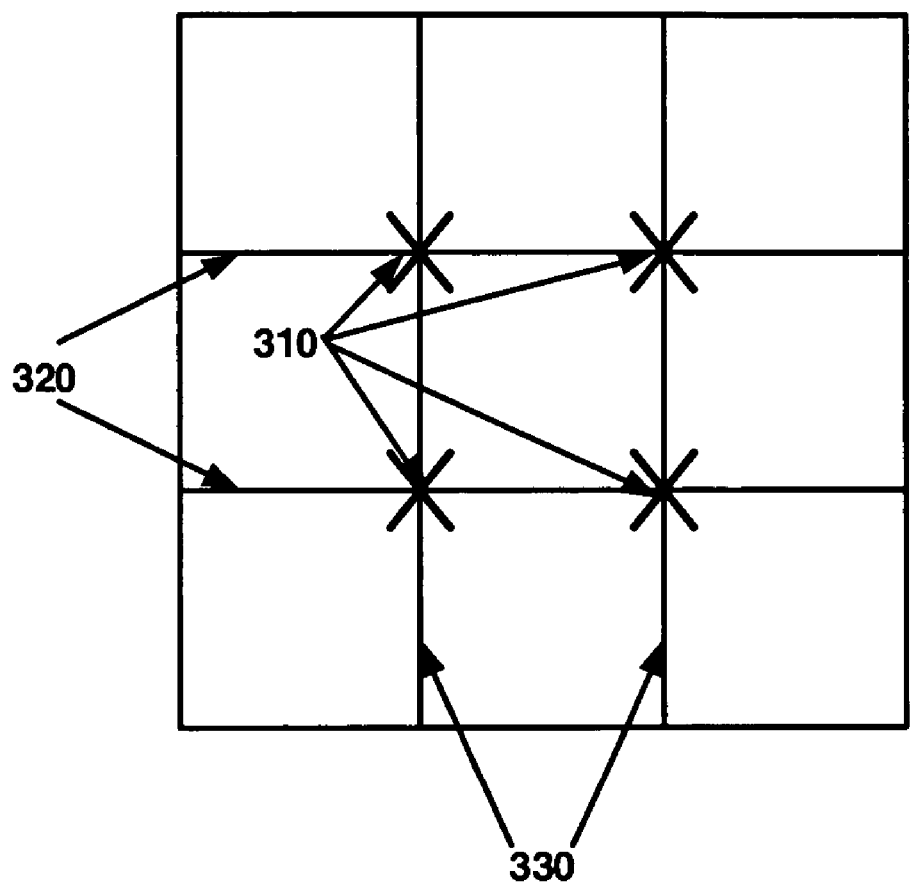
FIG. 3A is a diagram illustrating the one-third composition rule, in accordance with one embodiment of the present invention.

The global figure-of-merits assess the validity of various assumptions for each image. In one embodiment, the assumptions are:

1. The foreground is always sharp while the background may or may not be sharp;
2. The foreground is likely to be near the center of the image, specifically on the intersections of one-third horizontal and vertical lines, referred to as the "one-third composition rule" (see FIG. 3A);
3. The foreground is typically brighter than the background;
4. The colors of foreground are typically more vivid and saturated than the background; and
5. The size of the foreground is not too small.

It should be appreciated that the third and fourth assumptions may not always hold. Exceptions include blue sky and white snow, which occur commonly, and are thus accounted for using the sky determination and snow determination as described above.

Since some parts of the image could be blurry while some other parts are sharp, a single sharpness value may not truly represent how well the whole image is focused. Using more than one global figure-of-merit allows for the detection of images that are focused on the background in addition to the images that are blurry. In one embodiment, five global figure-of-merits are calculated for detecting if the image is ill-focused. It should be appreciated that any number of global figure-of-merits may be used, and that embodiments of the present invention are not limited to the described global figure of merits.

Figure 3B:
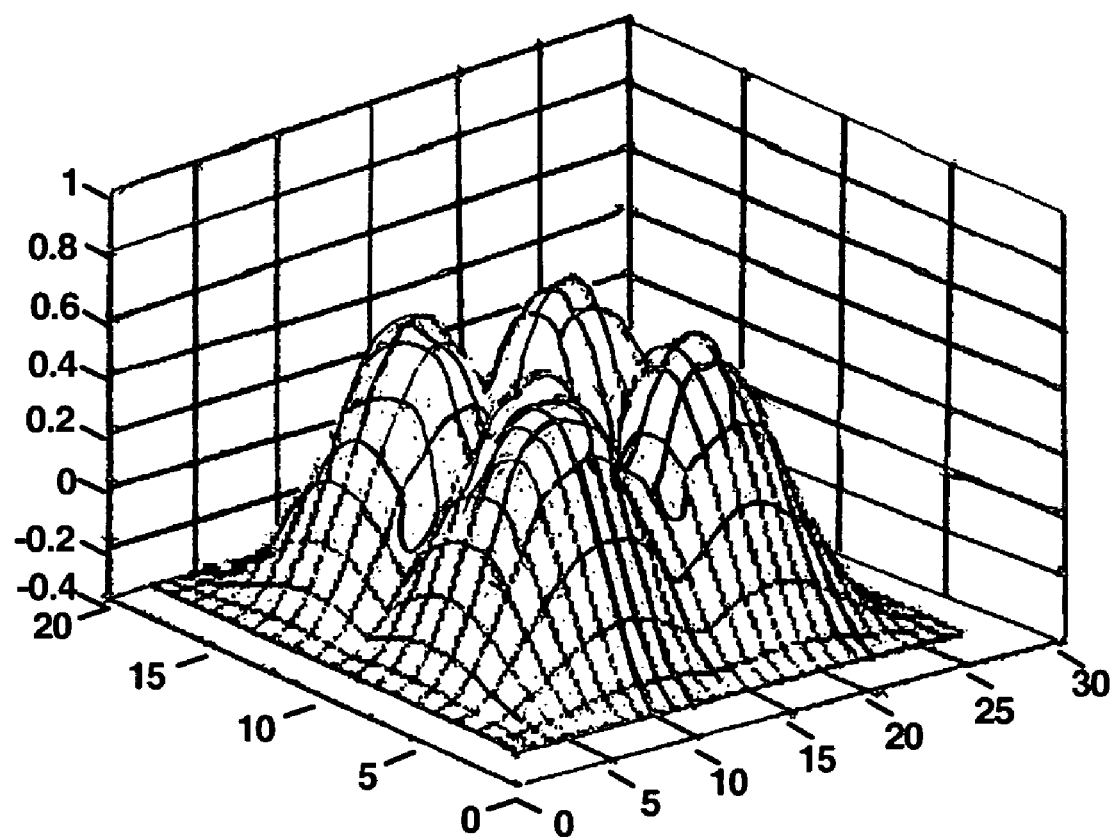
FIG. 3B is a three-dimensional curve for weighting the matrix of sharpness measures, in accordance with one embodiment of the present invention.

In one embodiment, the composition figure-of-merit is analyzed. The composition figure-of-merit describes the spatial distribution of the sharp blocks. Since it is more likely to have the foreground (or the object of interest) near the center of the image, the composition figure-of-merit based on the spatial distribution of the sharp blocks outputs high scores when the sharp blocks are located near the center. Furthermore, the composition figure-of-merit also accounts for the known "one-third composition rule", which states that it is desirable to put the object of interest on the intersections 310 of one-third horizontal lines 320 and one-third vertical lines 330, as shown on one-third composition diagram 300 of FIG. 3A). In one embodiment, the matrix of sharpness measures are weighted with the three-dimensional curve 350 of FIG. 3B and sum the resulting values to obtain the composition figure-of-merit. This figure-of-merit is used in determining whether the image is focused on the background or foreground, and is used for assessing the validity of assumptions 1 and 2.

In one embodiment, the brightness index figure-of-merit is analyzed. The brightness index figure-of-merit describes the relative brightness of the sharp blocks. Since it is more likely for the foreground to be brighter than the background, the brightness index figure-of-merit should be high for cases when the sharp areas are brighter than blurry areas. In one embodiment, the brightness index figure-of-merit is determined by computing the average brightness difference between the sharp and blurry areas using the average brightness local measure. The brightness index figure-of-merit is used for assessing the validity of assumptions 1 and 3.

In one embodiment, the color saturation index figure-of-merit is analyzed. The color saturation index figure-of-merit describes the relative color saturation of the sharp blocks. Since it is likely for the region of interest to have more vivid colors than the background, the color saturation index figure-of-merit should be high for cases when the sharp areas are more vivid in color than the blurry areas. In one embodiment, the color saturation figure-of-merit is determined by computing subtracting the average color saturation local measure of the blurry areas from that of the sharp areas. The color saturation index figure-of-merit is used for assessing the validity of assumptions 1 and 4.

In one embodiment, the density of sharp blocks figure-of-merit is analyzed. The density is the number of sharp blocks over the total number of blocks in the image. If the density is too low (e.g., less than 10%), it would mean that only a very small part of the image is sharp and that the image is blurry. If the density if very high (e.g., greater than 60%), it would mean that the image is well-focused on both the background and foreground. Note that this measure alone will not be able to determine if the image is focused on the foreground or the background. The density of sharp blocks figure-of-merit assesses the validity of assumptions 1 and 5.

In one embodiment, the median of the sharpness values of the blocks figure-of-merit is analyzed. This figure-of-merit can show how well the image is focused in general. If the number is high, then the image is sharp overall. The image can be identified as being blurry if this median value is too low. A low value of median could tell if the image has some motion blur caused by the camera or a large object. The median of the sharpness values of the blocks figure-of-merit assesses the validity of assumption 1.

In one embodiment, other statistic measures can be used to determine if the image is blurry or not. In one embodiment, the global figure-of-merits includes metadata 245 associated with the image. In one embodiment, the metadata is Exchangeable Image File format (EXIF) metadata. EXIF metadata is widely used in digital photography, and includes information such as exposure time, whether the flash fired, and the focus distance.

With reference to FIG. 2, focus indicator 240 is operable to determine an indication of focus 250 for the image. Focus indicator 240 bases this determination on the global figure-of-merits as determined in global figure-of-merits determination module 230. In one embodiment, the indication of focus 250 is also based on metadata 245 (e.g., EXIF metadata). The metadata 245 may be used to verify the analysis, and weight the analysis if the analysis is borderline.

In one embodiment, indication of focus 250 indicates whether image 205 is well-focused or ill-focused (e.g., whether the foreground is sharp or not). In another embodiment, indication of focus 250 is a numerical value indicating how well an image is focused (e.g., a value in the range of 1 to 5, where 1 is ill-focused and 5 is well-focused).

In another embodiment, indication of focus 250 may be used to automatically perform actions associated with the image. For example, if indication of focus 250 is below a minimum quality threshold, the image may be automatically deleted.

Figure 4:
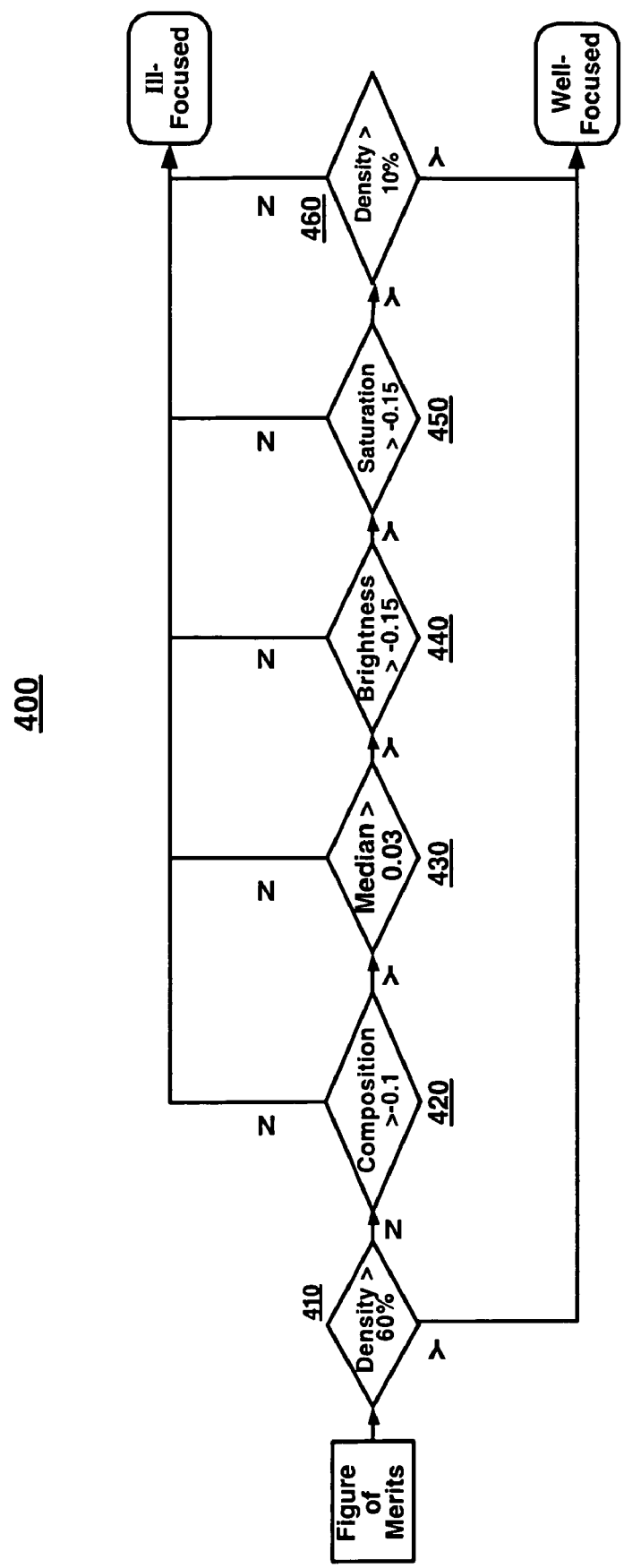
FIG. 4 illustrates a flowchart of an exemplary process for determining whether an image is well-focused based on the global figure-of-merits, in accordance with one embodiment of the present invention.

FIG. 4 illustrates a flowchart of an exemplary process 400 for determining whether an image is well-focused based on the global figure-of-merits, in accordance with one embodiment of the present invention. It should be appreciated that process 400 is exemplary, and that any combination of global figure-of-merits and associated threshold values may be used.

With reference to exemplary process 400, at step 410, it is determined whether the density of sharp blocks figure-of-merit is greater than 60%. If the density of sharp blocks figure-of-merit is greater than 60%, it is determined that the image is well-focused, and process 400 ends. Alternatively, if density of sharp blocks figure-of-merit is not greater than 60%, process 400 proceeds to step 420.

At step 420, it is determined whether the composition figure-of-merit is greater than −0.1. If the composition figure-of-merit is greater than −0.1, process 400 proceeds to step 430. Alternatively, if the composition figure-of-merit is not greater than −0.1, it is determined that the image is ill-focused and process 400 ends.

At step 430, it is determined whether the median of the sharpness values figure-of-merit is greater than 0.03. If the median of the sharpness values figure-of-merit is greater than 0.03, process 400 proceeds to step 440. Alternatively, if the median of the sharpness values figure-of-merit is not greater than 0.03, it is determined that the image is ill-focused and process 400 ends.

At step 440, it is determined whether the brightness index figure-of-merit is greater than −0.15. If the brightness index figure-of-merit is greater than −0.15, process 400 proceeds to step 450. Alternatively, if the brightness index figure-of-merit is not greater than −0.15, it is determined that the image is ill-focused and process 400 ends.

At step 450, it is determined whether the color saturation index figure-of-merit is greater than −0.15. If the color saturation index figure-of-merit is greater than −0.15, process 400 proceeds to step 460. Alternatively, if the color saturation index figure-of-merit is not greater than −0.15, it is determined that the image is ill-focused and process 400 ends.

At step 460, it is determined whether the density of sharp blocks figure-of-merit is greater than 10%. If the density of sharp blocks figure-of-merit is greater than 10%, it is determined that the image is well-focused, and process 400 ends. Alternatively, if the density of sharp blocks figure-of-merit is not greater than 10%, it is determined that the image is ill-focused, and process 400 ends.

It should be appreciated that by adjusting the threshold values of process 400, the indication of focus can be tuned according to predetermined preferences. The threshold values may be set at the time of manufacture, or may be adjusted by a user.

In one embodiment, system 200 is implemented within a digital camera. Digital cameras typically allow the user to review the photo on a LCD screen (e.g., display device 105 of FIG. 1) the instant after the photograph is taken, and it has become easier to make necessary adjustments and learn from the previous experiences. In one embodiment, indication of focus 250 of an image is a numerical value indicating how well an image is presented on the display screen. Note that the indication may be displaying a text message or illustrating where the image is focused, e.g., system 200 can show that the image is focused on the background rather than the foreground and indicate which portions are well-focused. For example, the message may be a warning that the photo may not be well-focused, and that the user should consider magnifying the image on the LCD screen to determine whether the image is well-focused. In response to presenting this warning, the digital camera may also automatically zoom in to a portion of the image that may be out of focus: The user may then re-take the picture to improve the foreground sharpness. Since the spatial resolution of the LCD screen at the back of the digital camera is typically much lower than the sensor resolution, the user may not be able to tell if the captured image is well-focused without zooming in. Thus, it is useful to have the camera detect if the photo is ill-focused and give feedback to the user.

In another embodiment, system 200 is implemented within a photo printer. Some photo printers have LCD screens (e.g., display device 105 of FIG. 1) to view the photograph before printing. The LCD screen has limited spatial resolution, like the one in a digital camera, and it may be difficult to determine if a photograph is well-focused or not by viewing the image on the LCD display. Since printing an image on a premium quality paper is much more expensive than saving it in storage devices, the user is typically more careful when deciding to print a photo or not. In one embodiment, the indication of focus for an image is presented on the display screen. In another embodiment, a message related to focus of the image is presented on the LCD screen of the digital camera, where the message is based on the indication of focus. For example, the message may be a warning that the image is not well-focused. In another embodiment, the focus estimation process can provide guidelines on the recommended print size of the photograph. Although some photographs have large pixel count, it may be better to print them in smaller sizes due to the blurriness of the photographs.

Figure 5:
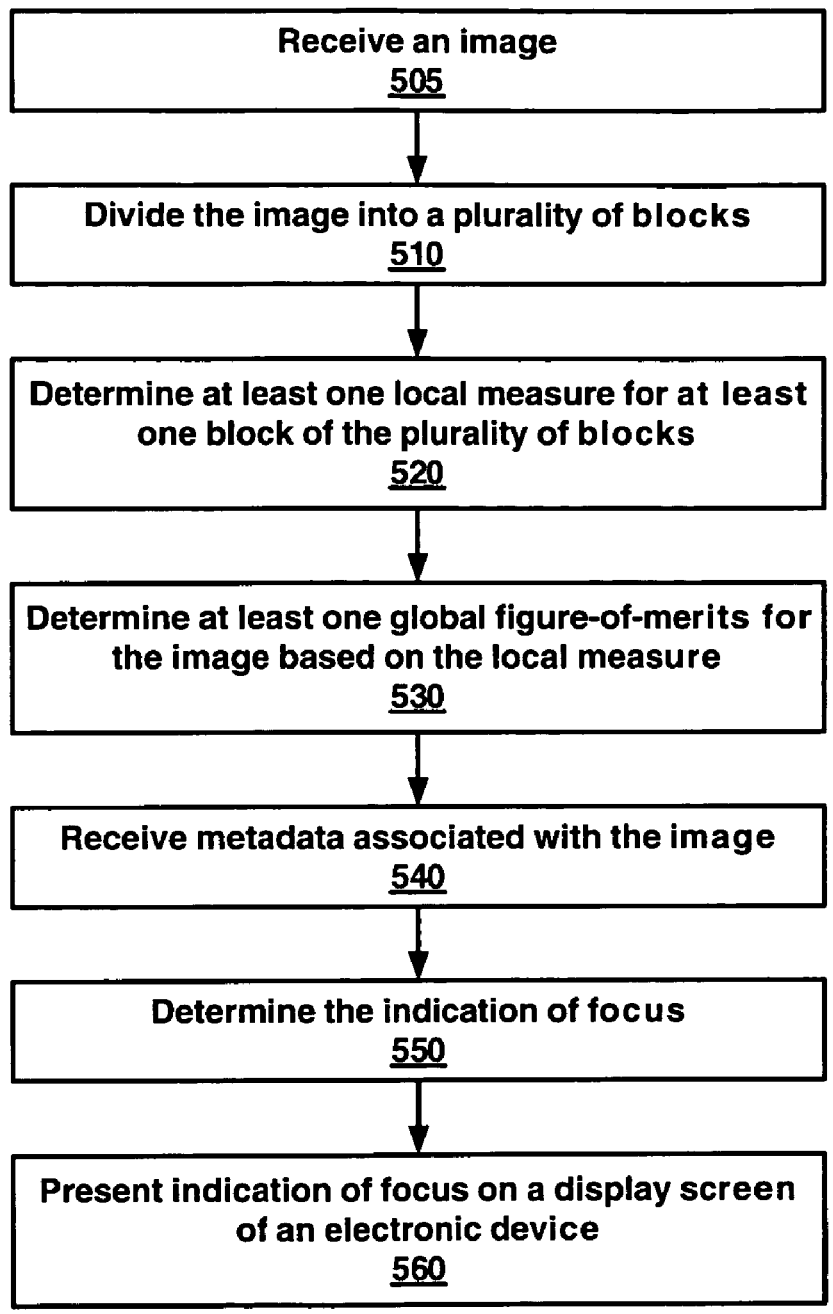
FIG. 5 illustrates a flowchart of a process for determining an indication of how well-focused an image is, in accordance with one embodiment of the present invention.

FIG. 5 illustrates a computer-controlled process 500 for determining an indication of how well an image is focused, in accordance with an embodiment of the present invention. In one embodiment, process 500 is carried out by processors and electrical components (e.g., electronic device 100 of FIG. 1) under the control of computer readable and computer executable instructions, such as the described system. Although specific steps are disclosed in process 500, such steps are exemplary. That is, the embodiments of the present invention are well suited to performing various other steps or variations of the steps recited in FIG. 5.

At step 505 of process 500, and image is received. In one embodiment, the image is located in storage of an electronic device (e.g., volatile memory 102, non-volatile memory 103, or data storage device 104 of FIG. 1). At step 510, the image is divided into a plurality of blocks. In one embodiment, the blocks are non-overlapping blocks.

At step 520, at least one local measure for at least one block is determined. There are a number of local measures that can be determined, including but not limited to: a sharpness measure, an average brightness, an average color saturation a sky determination, a snow determination, and a saturation determination. It should be appreciated that any number of local measures may be used, and that embodiments of the present invention are not limited to the described local measures.

At step 530, at least one global figure-of-merits for the image is determined based on the local measure. There are a number of global figure-of-merits that can be determined, including but not limited to: composition, brightness index, color saturation index, density of sharp blocks, and median of sharpness values. It should be appreciated that any number of global figure-of-merits may be used, and that embodiments of the present invention are not limited to the described global figure-of-merits.

At step 540, in one embodiment, metadata associated with the image is received. In one embodiment, the metadata is EXIF metadata. It should be appreciated that step 540 is optional. At step 550, an indication of focus for the image is determined based on the global figure-of-merits. In one embodiment, the indication of focus is determined based on the global figure-of-merits and the metadata. In one embodiment, the indication of focus provides an indication of foreground sharpness of the image.

At step 560, the information associated with the indication of focus is presented on the display screen of an electronic device. In one embodiment, the information is the indication of focus. In another embodiment, the information is a message related to foreground sharpness of the image on a display screen of an electronic device, wherein the message is based on said indication of focus. In one embodiment, the message includes a warning that the image is not well-focused. In another embodiment, the message includes advice on how to improve image quality of the image. In one embodiment, the electronic device is a digital camera. In another embodiment, the electronic device is a photo printer. In another embodiment, the electronic device is a computer system.

In summary, in its various embodiments, the present invention provides an indication of how well-focused an image is. The indication of focus uses various local measures and global figure-of-merits to measure how well-focused the image is. The indication of focus may be used to indicate to a user how ill-focused an image is. Based on the indication of focus, the user can take an informed course of action, such as re-taking a photograph or deleting an image.

The preferred embodiment of the present invention, a method and system for determining an indication of how well an image is focused, is thus described. While the present invention has been described in particular embodiments, it should be appreciated that the present invention should not be construed as limited by such embodiments, but rather construed according to the following claims.

What is claimed is:

1. A method for determining an indication of focus of an image, said method comprising:
   dividing said image into a plurality of blocks;
   determining at least one local measure for at least one block of said plurality of blocks;
   determining at least one global figure-of-merit for said image based on said local measure;
   determining said indication of focus based on said global figure-of-merit; and
   presenting said indication of focus on a display screen of an electronic device.

2. The method as recited in claim 1 wherein said plurality of blocks are non-overlapping blocks.

3. The method as recited in claim 1 wherein at least one said local measure is selected from a group consisting of: sharpness measure, average brightness, average color saturation, sky determination, snow determination, and saturation determination.

4. The method as recited in claim 1 wherein said at least one global figure-of-merit is selected from a group consisting of: density percentage of sharp blocks, median of sharpness measures, spatial distribution of sharp blocks, brightness index, color saturation index, and composition.

5. The method as recited in claim 1 further comprising receiving metadata associated with said image.

6. The method as recited in claim 5 wherein said determining said indication of focus comprises determining said indication of focus based on said global figure-of-merit and said metadata.

7. The method as recited in claim 5 wherein said metadata is Exchangeable Image File format (EXIF) metadata.

8. The method as recited in claim 1 further comprising presenting a message related to how well-focused an image is on a display screen of an electronic device, wherein said message is based on said indication of focus.

9. The method as recited in claim 1 further comprising presenting an indication of where said image is focused on a display screen of an electronic device, wherein said indication of where said image is focused is based on said indication of focus.

10. An electronic hardware device for determining an indication of focus of an image, said electronic hardware device comprising:
    a hardware image divider for dividing said image into a plurality of blocks;
    a local measure determination hardware module for determining at least one local measure for at least one block of said plurality of blocks;
    a global figure-of-merit determination hardware module for determining at least one global figure-of-merits for said image based on said local measure;
    a hardware focus indicator for determining said indication of focus based on said global figure-of-merit; and
    a display for presenting said indication of focus.

11. The electronic hardware device as recited in claim 10 wherein said plurality of blocks are non-overlapping blocks.

12. The electronic hardware device as recited in claim 10 wherein at least one said local measure is selected from a group consisting of: sharpness measure, average brightness, average color saturation, sky determination, snow determination, and saturation determination.

13. The electronic hardware device as recited in claim 10 wherein said at least one global figure-of-merit is selected from a group consisting of: density percentage of sharp blocks, median of sharpness measures, spatial distribution of sharp blocks, brightness index, color saturation index, and composition.

14. The electronic hardware device as recited in claim 10 wherein said focus indicator is operable to receive metadata associated with said image.

15. The electronic hardware device as recited in claim 14 wherein said indication of focus is based on said global figure-of-merit and said metadata.

16. The electronic hardware device as recited in claim 14 wherein said metadata is Exchangeable Image File format (EXIF) metadata.

17. The electronic hardware device as recited in claim 10 further comprising a display for presenting a message related to if an image is out-of-focus, wherein said message is based on said indication of focus.

18. The electronic hardware device as recited in claim 10 further comprising a display for presenting an indication of where said image is focused, wherein said indication of where said image is focused is based on said indication of focus.

19. A non-transitory computer-usable medium having computer-readable program code embodied therein for causing a computer system to perform a method for determining an indication of focus for an image, said method comprising:
    dividing said image into a plurality of blocks;
    determining at least one local measure for at least one block of said plurality of blocks;
    determining at least one global figure-of-merit for said image based on said local measure;
    determining said indication of focus based on said global figure-of-merit; and
    presenting said indication of focus on a display screen of an electronic device.

20. The non-transitory computer-usable medium as recited in claim 19 wherein said plurality of blocks are non-overlapping blocks.

21. The non-transitory computer-usable medium as recited in claim 19 wherein at least one said local measure is selected from a group consisting of: sharpness measure, average brightness, average color saturation, sky determination, snow determination, and saturation determination.

22. The non-transitory computer-usable medium as recited in claim 19 wherein said at least one global figure-of-merit is selected from a group consisting of: density percentage of sharp blocks, median of sharpness measures, spatial distribution of sharp blocks, brightness index, color saturation index, and composition.

23. The non-transitory computer-usable medium as recited in claim 19 wherein said method further comprises receiving metadata associated with said image.

24. The non-transitory computer-usable medium as recited in claim 23 wherein said determining said indication of focus comprises determining said indication of focus based on said global figure-of-merit and said metadata.

25. The non-transitory computer-usable medium as recited in claim 23 wherein said metadata is Exchangeable Image File format (EXIF) metadata.

26. The non-transitory computer-usable medium as recited in claim 19 wherein said method further comprises presenting a message related to said indication of focus on a display screen of an electronic device, wherein said message is based on said indication of focus.

27. The non-transitory computer-usable medium as recited in claim 19 wherein said method further comprises presenting an indication of where said image is focused on a display screen of an electronic device, wherein said indication of where said image is focused is based on said indication of focus.

* * * * *